Patented June 12, 1928.

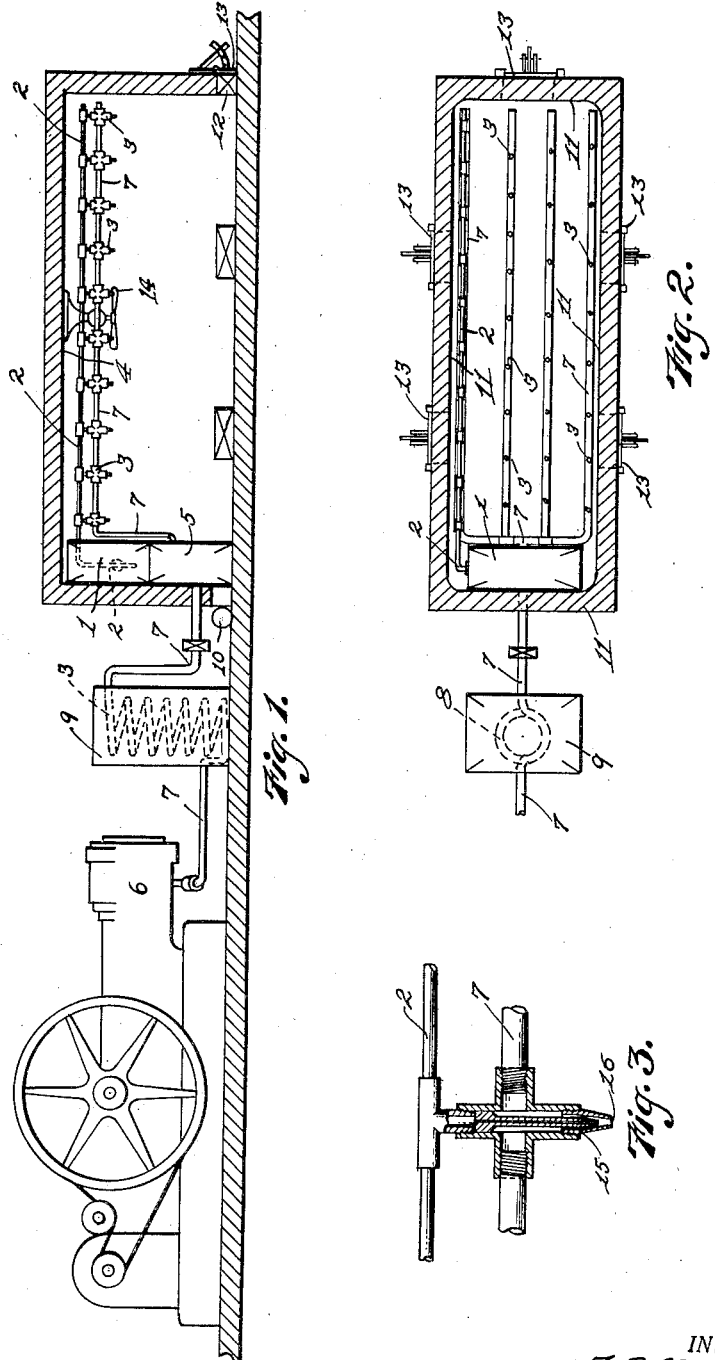

1,673,694

UNITED STATES PATENT OFFICE.

ALBERT REGINALD McLEOD, OF SYDNEY, NEW SOUTH WALES, AUSTRALIA, ASSIGNOR TO FOOD CHILLERS LIMITED, OF SYDNEY, NEW SOUTH WALES, AUSTRALIA, A COMPANY OF NEW SOUTH WALES.

METHOD FOR THE CONSERVATION OF MEAT, EGGS, FRUIT, AND OTHER FOODSTUFFS FOR LENGTHY PERIODS UNDER CHILLED CONDITIONS.

Application filed June 27, 1927, Serial No. 201,818, and in Australia June 30, 1926.

Freezing has usually a detrimental effect upon meat and other food stuffs, while the chilling process ordinarily employed is not effective over long periods.

My invention is used in combination with the chilling process and its principal feature consists in the employment of a salt fog within the chilling room.

In practice I employ an insulated chamber which is provided with, or connected to, ordinary refrigerating means whereby a temperature suitable for chilling is created and maintained therein.

The chamber is filled with salt fog which may contain one quarter of one per cent, to, one per cent, or, even more of sodium chloride.

The fog is constantly agitated and is renewed from time to time as found advisable. When meat is being operated upon the fog would be renewed say once in every eight hours.

The fog is produced from a solution of sodium chloride which is atomized by compressed air through atomizers of ordinary construction located at the top of the chilling chamber.

The salt solution and the container of the compressed air are arranged within the chamber, otherwise it may be advisable to employ means for cooling the solution and also the air.

Agitation of the fog may be effected by electrically driven oscillating fans, located near the ceiling of the chamber.

When new fog is being introduced the used fog and gases emanating from the meat or other food stuffs are expelled through doors or automatic valves located at the bottom of the chamber, the valves being of sufficient area and being designed to prevent the pressure in the chamber rising above that of the atmosphere.

I do not claim novelty for the details of construction of apparatus employed in connection with my invention, this will be varied to meet the views of refrigerating engineers, but by way of illustration and further description, I refer to the accompanying drawing wherein:—

Fig. 1 is a side sectional elevation.
Fig. 2 a part corresponding plan and
Fig. 3 a sectional elevation.

The tank 1 contains a solution in water of sodium chloride which is led by pipes 2 to a series of atomizers 3 at the top of the chamber 4. Air is compressed in the tank 5 by a compressor pump 6 and is led to the several atomizers by pipes 7. Air compressed by the pump is cooled by passing it through a coil pipe 8 immersed in water in the tank 9. A discharge trap 10 permits the escape of water of condensation.

The chamber which has a door has insulating walls 11 and a series of openings 12 normally closed by flap doors 13.

Fans 14 at the top of the chamber agitate the fog continuously except while recharging is taking place.

In the atomizer shown in Fig. 3 the nozzle 15 is connected to the pipe 2 containing sodium chloride solution and projects into the conical nozzle 16 of the compressed air pipe 7.

When some foodstuffs, more particularly meat, are to be dealt with each piece should be enclosed within a specially prepared covering which will not absorb or hold moisture and yet will permit the passage of gases.

The chilling chamber should be thoroughly sterilized and dried before use. The meat is then disposed within it so that there is clear space around each piece.

The chilling process is then commenced and when the temperature has been sufficiently reduced the meat may be more closely packed, but it is advisable there should always be a clear space around each piece.

The salt fog is then produced until the chamber is filled at normal pressure when the fans are set in motion.

The temperature in the chamber should never be reduced to freezing and the humidity should not be more than sufficient to carry the required percentage of sodium chloride.

I claim:

1. A method of conserving food stuff consisting in keeping it at a low temperature, above freezing point, in an atmosphere of salt, substantially as described.

2. The herein described method of conserving foodstuffs consisting in placing such foodstuffs in an insulated chamber the temperature within which is reduced to a little above freezing point, maintaining in said chamber a salt fog produced by the atomization of a solution in water of common salt and, as often as required, withdrawing said fog with the gases given off from the food stuffs.

3. The herein described method of conserving foodstuffs consisting in placing such foodstuffs in an insulated chamber the temperature within which is reduced to a little above freezing point, maintaining in said chamber a salt fog produced by the atomization of a solution in water of common salt, agitating the fog by means of fans or the like and as often as required withdrawing said fog with the gases given off from the food stuffs.

In testimony whereof I have signed my name to this specification.

ALBERT REGINALD McLEOD.